United States Patent [19]

Sisolak

[11] Patent Number: 5,013,615
[45] Date of Patent: May 7, 1991

[54] GLASS TO METAL SEAL

[75] Inventor: Robert J. Sisolak, Huntington Beach, Calif.

[73] Assignee: General Ceramics, Inc., Anaheim, Calif.

[21] Appl. No.: 479,535

[22] Filed: Feb. 12, 1990

[51] Int. Cl.$^5$ .......................... H01J 5/00; B32B 15/00
[52] U.S. Cl. ................... 428/668; 174/50.63; 403/30; 428/681; 428/682; 428/935
[58] Field of Search ............... 428/685, 682, 681, 680, 428/935; 174/50.61, 50.63; 403/29, 30

[56] References Cited

U.S. PATENT DOCUMENTS 2,334,020 11/1943 Miller, et al. ........................ 428/545
4,915,719 4/1990 Saffari ................................. 65/32.2

Primary Examiner—R. Dean
Assistant Examiner—Robert R. Koehler
Attorney, Agent, or Firm—Harris, Kern, Wallen & Tinsley

[57] ABSTRACT

A glass to metal seal for mounting an electrical conductor in a metal wall, such as a microelectronic circuit case, and a method of mounting. The metal lead which serves as the electrical conductor is coated with a layer of iron by electroplating and the iron coated lead is mounted in the opening of the metal wall with a glass insulating sleeve. In an alternative embodiment, a barrier layer of electroplated and sintered nickel is provided on the metal lead under the iron layer. A similar layer of iron may be provided on the case wall at the lead opening, and a barrier layer may be provided on the case wall under the iron layer.

10 Claims, 1 Drawing Sheet

GLASS TO METAL SEAL

BACKGROUND OF THE INVENTION

This invention relates to glass to metal seals of the type used for obtaining hermetic seals in microcircuit cases and the like. A microcircuit case typically has a number of feed through connector pins positioned in glass insulators in one or more of the case walls for making electrical connections between the microcircuit within the case and the adjacent circuitry. The usual construction consists of a metal lead serving as an electrical conductor, with the metal lead mounted in an opening in the metal wall with a glass insulating sleeve.

Two forms of seals are used for providing electrical connections through a metal wall. One type is called a matched seal, wherein both the conductor and case are formed of a material which has a coefficient of thermal expansion substantially matching the coefficient of thermal expansion of the insulating material, typically a glass. In this type of construction, the glass and the conductor change shape with temperature in substantially the same amount so that the seal between the glass and case and the glass and conductor is not adversely affected by thermal cycling. Typically the metal used for the conductor and case is a special iron-nickel-cobalt alloy (29% nickel, 17% cobalt, 53% iron and 1% minor ingredients) known as ASTM-F15.

A second type of seal is called a compression seal, wherein the coefficient of thermal expansion of the glass insulator is greater than that of the conductor, but less than that of the case. Then with changes of temperature within the expected range of operation, the sealed surfaces remain pressed firmly together at all times so that a hermetic seal is maintained. A variety of materials may be used for the conductor and case if the proper order of the coefficient of thermal expansion for the materials is maintained. Typical conductor materials are ASTM-F15 or alloy-52, and typical case materials are cold rolled or stainless steel.

Both matched seals and compression seals have been used in the past, and both have been satisfactory for many situations. However the increased demand for more reliable hermetic seals with increased thermal cycling requirements and at the same time with lower costs, has made the present designs unsatisfactory for some applications.

A typical prior art case device is shown in U.S. Pat. No. 3,548,076. The electrically conducting leads are positioned in a metal wall by glass seals. U.S. Pat. No. 3,370,874 shows the use of an iron oxide layer on the exterior of the lead for improved sealing with the glass. The iron oxide layer has proved satisfactory in some situations, but problems are encountered in other situations. The iron oxide layer typically is produced in a furnace. To maintain the proper atmosphere and temperature stability, large furnaces are normally used even for oxidation of relatively small components. The iron oxide layer has become a less cost effective method of manufacture as the relative cost of energy has increased. A second problem with the iron oxide layer is that it tends to cause the glass to climb up the sealed lead. As the demand for small microcircuit cases with a large number of small leads increases, this tendency for the glass to climb up the lead results in a cone shape of the glass surface extending away from the case. The cone shaped glass surface is prone to handling damage.

It is an object of the present invention to provide a new and improved glass to metal seal for mounting an electrical conductor in a metal wall, and a method of sealing a metal lead in a metal wall, which provides improved hermetic sealing, particularly with thermal cycling, and at the same time is relatively simple and inexpensive to produce.

Other objects, advantages, feature and results will more fully appear in the course of the following description.

SUMMARY OF THE INVENTION

A glass to metal seal for mounting an electrical conductor in a metal wall, including a metal lead for serving as an electrical conductor, and, a layer of iron on the metal lead to form an iron coated lead, preferably obtained by electroplating. The lead with the layer of iron is mounted in an opening in a metal wall with a glass insulating sleeve. In one embodiment, a barrier metal layer is produced on the metal lead prior to applying the iron layer, with the barrier layer preferably produced by electroplating and sintering. Also a layer of iron, alone or with a barrier metal layer, may be provided on the metal wall at the glass sleeve if desired.

The invention also includes a method of sealing a metal lead in a metal wall, including the steps of providing a layer of iron on the metal lead to produce a coated lead, and sealing the coated lead in an opening in the metal wall with a glass sleeve, with the layer of iron preferably produced by electrodeposition. In one embodiment, a metal barrier layer is produced on the metal lead prior to applying the iron layer, with the metal barrier layer preferably produced by electrodeposition followed by sintering. Also the iron layer, alone or with the metal barrier layer, may be applied to the metal wall if desired.

DESCRIPTION OF THE PREFERRED EMBODIMENTS

Figure 1:
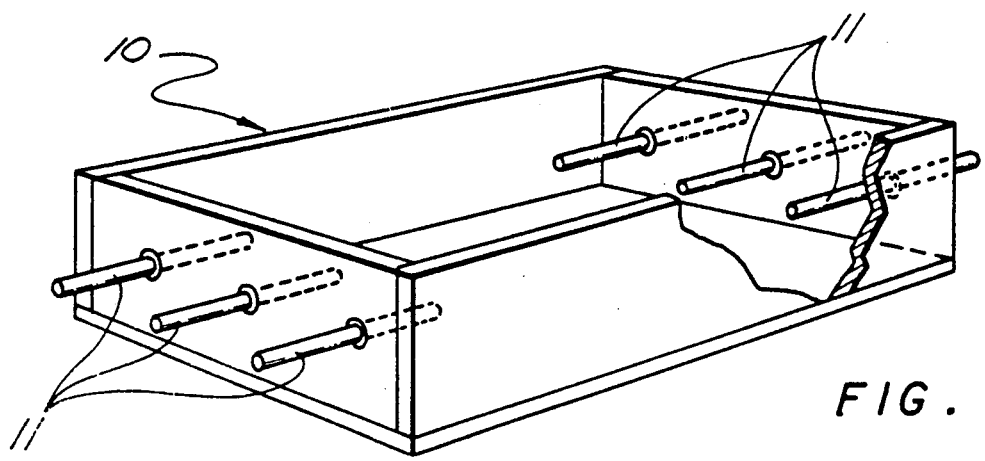
FIG. 1 is a perspective view of a microcircuit case with a plurality of leads mounted therein.

A microcircuit case 10 is shown in FIG. 1 with a plurality of leads 11 positioned in the end walls of the case to provide for electrical feed through connections between the interior and the exterior of the case. The case construction may be conventional except for the lead construction to be described.

Figure 2:
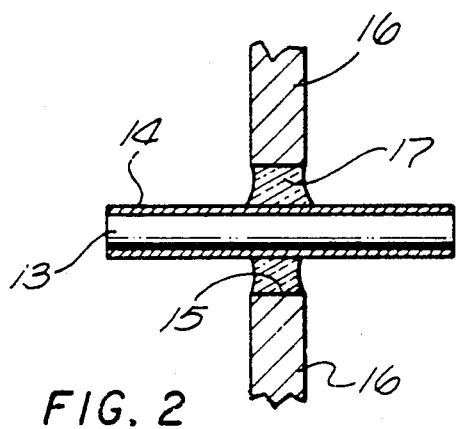
FIG. 2 is an enlarged partial sectional view of a wall of the case with a lead mounted therein and illustrating one embodiment of the invention.

In the embodiment of FIG. 2, a metal lead 13 has a layer of iron 14 thereon, and is positioned in an opening 15 of a wall 16 of the case, by means of a glass sleeve 17. The assembly of the iron coated lead in the glass sleeve in the wall may be conventional.

However the layer of iron 14 on the metal lead 13 is metallic iron, rather than iron oxide. This construction results in an improved hermetic seal between the glass sleeve and the coated lead, and between the glass sleeve and the case wall. This seal costs less to make, because the costly furnace heating step for oxide deposition is eliminated. The seal is easier to make, because the prior oxide formation step is more difficult to control and to measure than the processes used in depositing the iron layer. Another advantage of the use of metallic iron is that it is easier to control the wicking of the glass up the lead (glass climb). In the oxide formation, it is difficult to control glass climb to less than 0.010 inch and still achieve a reliable seal. Glass climb can be controlled to within 0.005 inch with the new iron layer process and still achieve strong bonding to the glass.

The iron layer is preferably produced by electroplating using standard commercial electrodeposition techniques. The layer is thin and preferably is in the range of 0.000010 inch to 0.001000 inch, with the presently preferred thickness being about 0.000250 inch. Alternatively, the iron layer may be produced by other techniques, including thin film deposition techniques, including vacuum evaporation, vacuum sputtering, and chemical vapor deposition.

For a matching seal, the metal lead 13 and case 16 preferably is made of an alloy such as ASTM-F15. For a compression seal, the lead preferably is made of alloy 42 or 52, and the case is stainless steel or cold rolled steel. The invention is suitable for use with the named materials as well as others used in the industry. The fabrication of compression seals either using or not using an iron oxide layer is well known in the industry. The use of an iron layer in compression seals provides the same adhesion while still allowing control of the glass flow as has been described for matched seals.

Figure 3:
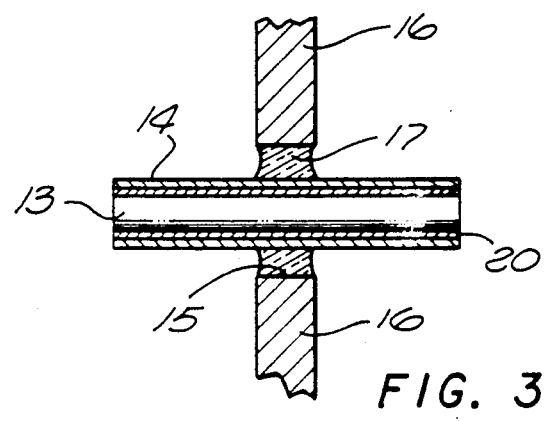
FIG. 3 is a view similar to that of FIG. 2 illustrating another embodiment of the invention.

An alternative embodiment of the invention is illustrated in FIG. 3 with a barrier layer of metal 20 between the metal lead 13 and the iron layer 14. Typically this barrier layer is produced by electrodeposition, and preferably is subsequently sintered. The presently preferred metal for the barrier layer is nickel, with other metals such as copper being suitable. The barrier layer provides improved corrosion protection of the metal forming the lead and the case.

Following normal glass sealing, parts are typically electroplated for corrosion protection. When iron oxide is used as the coating prior to sealing, most of the coating is dissolved by the glass. The corrosion protection electroplating stops at the glass interface, so that there remains a microscopic channel where moist air may penetrate and reach the lead material. The use of the iron layer allows the use of a corrosion resistant barrier layer covering the entire lead. This layer extends through the glass seal and protects the area of the lead where the final electroplating abuts the glass seal.

Figure 4:
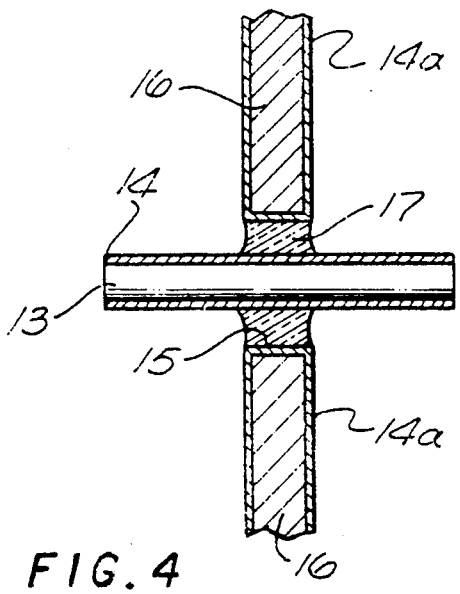
FIG. 4 is a view similar to that of FIG. 2 illustrating the embodiment of FIG. 2 with an iron layer on the case wall.

The embodiment of FIG. 4 is similar to that of FIGS. 2 and 3, with a layer of iron 14a on the wall of the case 10 adjacent the opening 15. The layer 14a may be the same as the layer 14.

Figure 5:
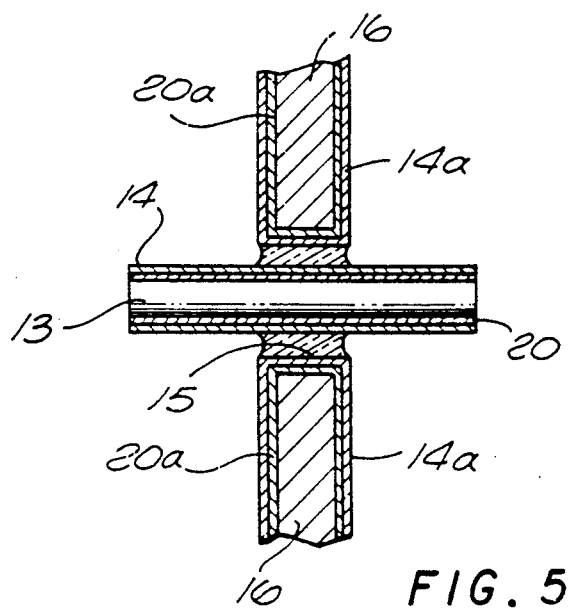
FIG. 5 is a view similar to that of FIG. 3 illustrating the embodiment of FIG. 3 with a barrier metal layer and an iron layer on the case wall.

The embodiment of FIG. 5 is similar to that of FIGS. 2-4, with a barrier layer of metal 20a between the wall 16 of the case 10 and the iron layer 14a. The layer 20a may be the same as the layer 20.

If desired, the surface of the lead and/or the surface of the case wall can be treated prior to application of the iron layer or the barrier metal layer to improve adhesion by use of conventional chemical or mechanical methods to alter the microtopography of the material.

In any compression seal, the coefficients of thermal expansion of the metal case should be greater than that of the glass which in turn, should be greater than that of the metal lead.

I claim:

1. In a glass to metal seal for mounting an electrical conductor in a metal wall, the combination of:
   a metal lead for serving as an electrical conductor;
   a layer of metallic iron on said metal lead to form an iron coated lead; and
   a glass insulating sleeve, with said lead mounted in an opening in a metal wall with said glass insulating sleeve.

2. A seal as defined in claim 1 wherein said layer of iron is an electroplated layer.

3. A seal as defined in claim 1 with a barrier metal layer on said metal lead, with said layer of iron over said barrier layer.

4. A seal as defined in claim 3 wherein said barrier layer is electroplated.

5. A seal as defined in claim 3 wherein said barrier layer is electroplated and sintered.

6. A seal as defined in claim 3 wherein said barrier layer is nickel.

7. A seal as defined of claim 1 wherein said metal lead is made of ASTM-F15.

8. A seal as defined of claim 1 wherein said metal lead is made of one of the group consisting of alloy 42 and alloy 52.

9. A seal as defined in claim 1 wherein said layer of iron is in the range of about 0.000010 to about 0.001000 inch thick.

10. A seal as defined in claim 1 wherein said layer of iron is about 0.000250 inch thick.

* * * * *